US012736026B2

(12) United States Patent
Coiro et al.

(10) Patent No.: US 12,736,026 B2
(45) Date of Patent: Sep. 15, 2026

(54) APPARATUS FOR PRODUCING ELECTRICAL ENERGY FROM WATER CURRENTS

(71) Applicant: EOLPOWER INVESTMENTS S.R.L., Naples (IT)

(72) Inventors: Domenico Coiro, Pozzuoli (IT); Salvatore Bruno, Maddaloni (IT); Giancarlo Troise, Naples (IT); Guido Lazzerini, Buitenwatersloot (NL)

(73) Assignee: EOLPOWER INVESTMENTS S.R.L., Naples (IT)

( * ) Notice: Subject to any disclaimer, the term of this patent is extended or adjusted under 35 U.S.C. 154(b) by 96 days.

(21) Appl. No.: 18/691,854

(22) PCT Filed: Sep. 14, 2022

(86) PCT No.: PCT/IT2022/050249
§ 371 (c)(1),
(2) Date: Mar. 13, 2024

(87) PCT Pub. No.: WO2023/042234
PCT Pub. Date: Mar. 23, 2023

(65) Prior Publication Data

US 2024/0376859 A1 Nov. 14, 2024

(30) Foreign Application Priority Data

Sep. 14, 2021 (IT) ........................ 102021000023699

(51) Int. Cl.
*F03B 13/26* (2006.01)

(52) U.S. Cl.
CPC ...... *F03B 13/264* (2013.01); *F05B 2240/917* (2013.01); *F05B 2240/97* (2013.01)

(58) Field of Classification Search
CPC ...... F03B 17/061; F03B 13/264; Y02E 10/30; Y02E 10/20; F05B 2240/93;
(Continued)

(56) References Cited

U.S. PATENT DOCUMENTS 3,986,787 A * 10/1976 Mouton, Jr. .......... F03B 17/061 415/121.2
4,516,033 A * 5/1985 Olson .................. F03B 17/062 416/85
(Continued)

FOREIGN PATENT DOCUMENTS

IT 20100016 A1 5/2012
JP S551445 A 1/1980
(Continued)

OTHER PUBLICATIONS

International Search Report and Written Opinion for corresponding International PCT Application No. PCT/IT2022/050249, dated Jan. 9, 2023.

*Primary Examiner* — Edwin J Toledo-Duran
(74) *Attorney, Agent, or Firm* — K&L Gates LLP

(57) ABSTRACT

Apparatus (10) for producing electrical energy comprising a device (11) for converting the kinetic energy of a water current into electrical energy and provided with a first float (12) on the sides of which there is positioned a plurality of casings (13) equipped with turbines (14) which are configured to rotate under the effect of the water current and each of which is connected to an electric generator (42) housed in a corresponding casing of said plurality of casings (13).

11 Claims, 3 Drawing Sheets

(58) Field of Classification Search
CPC ............ F05B 2240/917; F05B 2240/97; F05B 2240/40; F05B 2240/9176; E02B 2017/0091
See application file for complete search history.

(56) References Cited

U.S. PATENT DOCUMENTS

| | | | | | |
|---|---|---|---|---|---|
| 4,864,152 | A * | 9/1989 | Pedersen | F03B 17/061 | 290/53 |
| 7,105,942 | B2 * | 9/2006 | Henriksen | F03B 1/02 | 415/60 |
| 7,372,172 | B2 * | 5/2008 | Winkler | F03B 13/08 | 290/43 |
| 7,438,504 | B2 * | 10/2008 | Henriksen | F03B 13/264 | 114/264 |
| 8,097,218 | B1 * | 1/2012 | Manaugh | F03B 13/26 | 136/246 |
| 8,106,527 | B1 * | 1/2012 | Carr | F03D 9/28 | 290/54 |
| 8,237,304 | B2 * | 8/2012 | Dehlsen | F03B 17/061 | 290/43 |
| 8,288,882 | B2 * | 10/2012 | Bolin | F03B 17/061 | 290/43 |
| 8,421,254 | B2 * | 4/2013 | Desmeules | F03B 17/061 | 290/43 |
| 8,766,466 | B2 * | 7/2014 | Dehlsen | F03B 3/04 | 290/43 |
| 2002/0158472 | A1 * | 10/2002 | Robson | F03B 17/061 | 290/43 |
| 2004/0256857 | A1 * | 12/2004 | Bailey, III | F03B 13/00 | 290/43 |
| 2006/0008351 | A1 * | 1/2006 | Belinsky | F03B 17/063 | 416/170 R |
| 2007/0048086 | A1 * | 3/2007 | Thorsbakken | E02B 9/08 | 405/75 |
| 2007/0108768 | A1 * | 5/2007 | Dempster | F03B 17/063 | 290/42 |
| 2008/0116692 | A1 * | 5/2008 | Lagstrom | F03B 17/063 | 415/7 |
| 2009/0127861 | A1 * | 5/2009 | Sankrithi | F03B 13/264 | 290/54 |
| 2009/0146430 | A1 * | 6/2009 | Sear | F03B 17/061 | 290/54 |
| 2010/0045043 | A1 * | 2/2010 | Gostner | F03B 17/061 | 290/52 |
| 2010/0237625 | A1 * | 9/2010 | Dempster | F03B 7/00 | 290/54 |
| 2011/0018279 | A1 * | 1/2011 | Che | F03D 9/25 | 290/55 |
| 2011/0131970 | A1 * | 6/2011 | Johnston | F03B 17/062 | 60/497 |
| 2011/0316282 | A1 * | 12/2011 | Holstein | F03B 17/063 | 290/54 |
| 2012/0114483 | A1 * | 5/2012 | Carr | F03B 13/264 | 416/31 |
| 2013/0307274 | A1 * | 11/2013 | Sia | F03D 9/25 | 290/55 |
| 2014/0147248 | A1 * | 5/2014 | Akimoto | F03D 9/008 | 415/4.2 |
| 2018/0142668 | A1 * | 5/2018 | Pacardo | F03B 17/061 | |
| 2023/0041561 | A1 * | 2/2023 | Evans | F03B 11/00 | |

FOREIGN PATENT DOCUMENTS

| | | | |
|---|---|---|---|
| WO | 8804362 | A1 | 6/1988 |
| WO | 2009141617 | A2 | 11/2009 |
| WO | 2023042234 | A1 | 3/2023 |

* cited by examiner

APPARATUS FOR PRODUCING ELECTRICAL ENERGY FROM WATER CURRENTS

CROSS-REFERENCE TO RELATED APPLICATIONS

This application is a U.S. National Stage Entry under 35 U.S.C. § 371 of International Patent Application No. PCT/IT2022/050249, entitled APPARATUS FOR PRODUCING ELECTRICAL ENERGY FROM WATER CURRENTS, filed Sep. 14, 2022, which claims benefit of Italian Patent Application No. 102021000023699, filed Sep. 14, 2021, the entire disclosures of which are hereby incorporated by reference herein.

FIELD OF THE INVENTION

The present invention concerns an apparatus for producing electrical energy from water currents, for example water currents present in seas, lakes, rivers or other environments where there may be a water current.

BACKGROUND OF THE INVENTION

It is known that apparatuses exist for producing electrical energy from water currents, substantially consisting of a central floating unit on the sides of which further units are disposed, equipped with hydrokinetic turbines that rotate under the effect of the water current, for example a sea water current. Each of the turbines is then connected to the rotor of an electric generator.

The hydrokinetic turbines can be equipped with two or more blades that rotate about a certain axis which is substantially aligned with the direction of the sea current.

Although some known systems provide an automatic and passive alignment of the hydrokinetic turbines with respect to the direction of the sea current, providing for example that the apparatus is anchored to the seabed by means of mooring cables, the alignment and the stability of the apparatus are not always optimal.

Consequently, the efficiency of the apparatus in terms of conversion of kinetic energy into electrical energy can be compromised by this lack of alignment and stability; furthermore, the forces acting above all on the central floating unit, following the drive of the hydrokinetic turbines by the water current, can be considerable. Known apparatuses can also prove to be rather heavy and bulky. 25

There is therefore a need to perfect an apparatus for producing electrical energy from water currents that can overcome at least one of the disadvantages of the state of the art.

In particular, one purpose of the present invention is to provide an apparatus for producing electrical energy from water currents that is light and efficient, and allows to obtain electrical energy from the motion of a water current in a simple way.

Another purpose of the present invention is to provide an apparatus for producing electrical energy from water currents that allows a stable and effective alignment of the hydrokinetic turbines used with the direction of the water current.

Another purpose of the present invention is to provide an apparatus for producing electrical energy from water currents that has limited bulk and in which the forces involved do not cause a lack of stability or balance thereof.

The Applicant has devised, tested and embodied the present invention to overcome the shortcomings of the state of the art and to obtain these and other purposes and advantages.

SUMMARY OF THE INVENTION

The present invention is set forth and characterized in the independent claim. The dependent claims describe other characteristics of the present invention or variants to the main inventive idea.

In accordance with the above purposes, an apparatus for producing electrical energy comprises a device for converting the kinetic energy of a water current into electrical energy, provided with a first float on the sides of which there is positioned a plurality of casings equipped with turbines, each turbine being connected to an electric generator housed in the casings.

According to one characteristic aspect of the invention, the converter device is connected by means of first connection elements to an alignment device, connected on one side and by means of second connection elements to a second float and on the other side and by means of third connection elements to anchoring means; the alignment device is configured to allow the turbines to automatically align with the direction of the water current.

Advantageously, by means of the alignment device as above associated with the converter device, it is possible to create an apparatus for producing electrical energy from water currents that allows a stable and effective alignment of the turbines with the direction of the water current, therefore it allows to effectively convert the kinetic energy of the sea current into mechanical energy and then into electrical energy thanks to the electric generators coupled to the turbines.

According to another aspect of the invention, the alignment device comprises an external ring, to which the first connection elements are connected, the external ring rotating with respect to a fixed internal pin to which the second and third connection elements are connected.

According to another aspect of the invention, the external ring rotates with respect to the internal pin about an axis that is substantially orthogonal to the direction of the sea current.

According to another aspect of the invention, rolling means are positioned between the internal pin and the external ring.

According to another aspect of the invention, the first connection elements comprise at least one cable for connecting the first float to the external ring.

According to another aspect of the invention, the first connection elements comprise at least one rod for connecting each of the casings to the external ring.

According to another aspect of the invention, the second connection elements comprise a plurality of ropes attached on one side to the internal pin and on the other side to the second float.

According to another aspect of the invention, the third connection elements comprise a plurality of ropes attached on one side to the internal pin and on the other side to the anchoring means.

According to another aspect of the invention, the second and third connection elements are connected respectively to opposite ends of the internal pin.

According to another aspect of the invention, the converter device is equipped with a bulb positioned underneath the first float.

According to another aspect of the invention, the first float is substantially coplanar to the casings, and it is connected to them by means of structures which can have sections with a shape similar to wing profiles, or fairings similar to wing profiles.

According to another aspect of the invention, this first float contains inside it a plurality of watertight chambers which can contain air or water or a combination of the two with corresponding pumps and transfer valves, thus allowing to manage the upward buoyancy force and therefore the overall configuration of the converter device, as occurs in submarines for example.

DESCRIPTION OF THE DRAWINGS

These and other aspects, characteristics and advantages of the present invention will become apparent from the following description of some embodiments, given as a non-restrictive example with reference to the attached drawings wherein.

Figure 1:
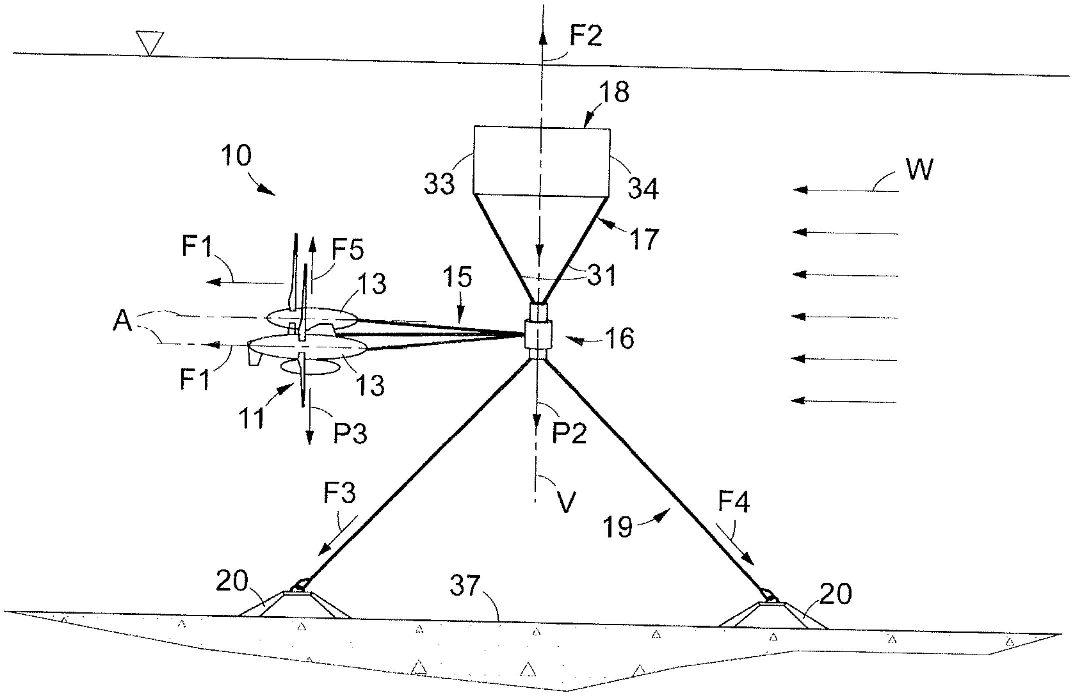
FIG. 1 is a schematic lateral view of an apparatus for producing electrical energy from water currents according to the present invention.

To facilitate comprehension, the same reference numbers have been used, where possible, to identify identical common elements in the drawings. It is understood that elements and characteristics of one embodiment can be conveniently combined or incorporated into other embodiments without further clarifications.

DESCRIPTION OF SOME EMBODIMENTS

We will now refer in detail to the possible embodiments of the invention, of which one or more examples are shown in the attached drawings, by way of a non-limiting illustration. The phraseology and terminology used here is also for the purposes of providing non-limiting examples.

Figure 2:
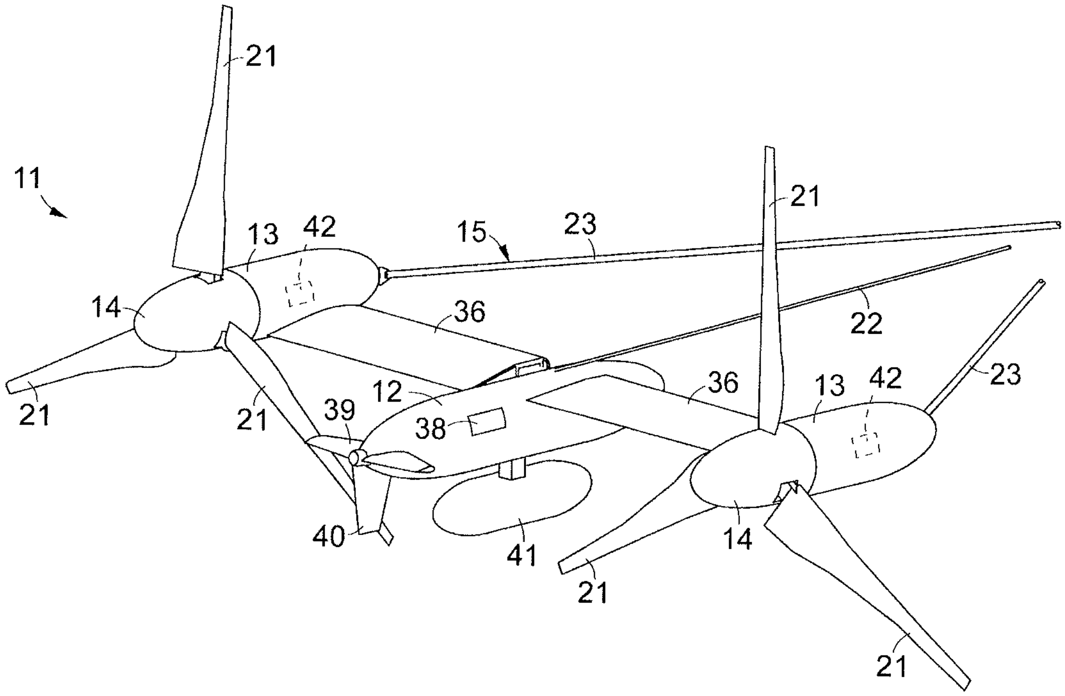
FIG. 2 is a three-dimensional view of a converter device provided in the present apparatus.

With reference to the attached drawings and in particular to FIG. 1 and FIG. 2 thereof, an apparatus 10 for producing electrical energy from water currents comprises a converter device 11 configured to convert the kinetic energy of a water current into electrical energy, and provided with a first float 12 on the sides of which there is positioned a plurality of casings 13 equipped with turbines 14, which are configured to rotate under the effect of the water current and which are each 25 connected to an electric generator 42 housed in a corresponding casing of the plurality of casings 13.

The converter device 11 is connected by means of first connection elements 15 to an alignment device 16 connected on one side and by means of second connection elements 17 to a second float 18, and on the other side and by means of third connection elements 19 to anchoring means 20. The alignment device 16 is configured to allow the turbines 14 to automatically align with the direction W of the water current.

The first float 12 can be equipped with a first horizontal tail plane 39 and a second vertical tail plane 40, which allow to increase the stability of the converter device 11 and to maintain its correct direction. The tail planes 39 and 40 are positioned at the end of the first float 12 which is opposite to that of connection to the first connection elements 15.

In particular, the vertical tail plane 40 helps to achieve the alignment of the turbines 14 with the direction W of the water current.

Figure 3:
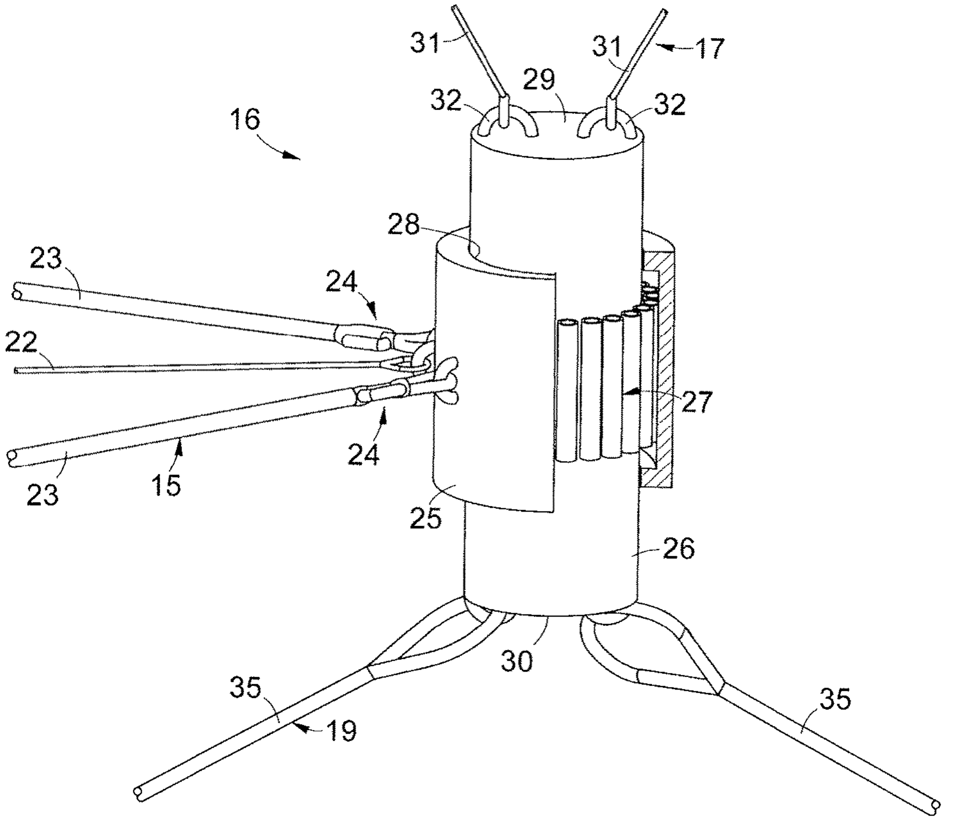
FIG. 3 is a schematic three-dimensional view of an alignment device of the present apparatus.

The alignment device 16, see FIG. 3, comprises an external ring 25 rotating with respect to a fixed internal pin 26. The first connection elements 15 are connected to the external ring 25, while the second and third connection elements 17 and 19 are connected to the internal pin 26. In particular, the second and third connection elements 17 and 19 are respectively connected to opposite ends 29 and 30 of the pin 26.

Between the pin 26 and the ring 25 there are positioned rolling means 27, for example cylindrical rollers, spheres, or suchlike. The ring 25 centrally comprises a through hole 28 which the internal pin 26 passes through. The pin 26 and the through hole 28 have a cylindrical shape. Preferably, the pin 26 has a greater extension than the ring 25, so as to allow a better attachment of the second and third connection elements 17 and 19.

The turbines 14 can provide a plurality of blades 21 which are made to rotate by the sea current directed in the direction W so that, substantially, the axes of rotation A of the blades 21 automatically align with the direction W of the water current, in particular thanks to the presence of the vertical tail plane 40. The water current can be, for example, a marine water current, which possibly changes direction of origin cyclically, or for example a tidal current, but it is not excluded that the present apparatus can be used in lakes, rivers or other environments where a water current is present.

The first connection elements 15 comprise a cable 22 for connecting the first float 12 to the external ring 25 of the alignment device 16.

The first connection elements 15 also comprise a rod 23 for connecting each of the casings 13 to the device 16, wherein the rod 23 comprises at the respective ends a hinge 24 for rotation and possible release.

The second connection elements 17 can comprise a plurality of ropes 31 attached on one side to the pin 26, for example by means of corresponding couplings 32 positioned on the end 29, and on the other side to the second float 18. In particular, it is possible to provide a pair of ropes 31 attached to each of the ends 33 and 34 of the second float 18, as in FIGS. 1 and 3.

Figure 5:
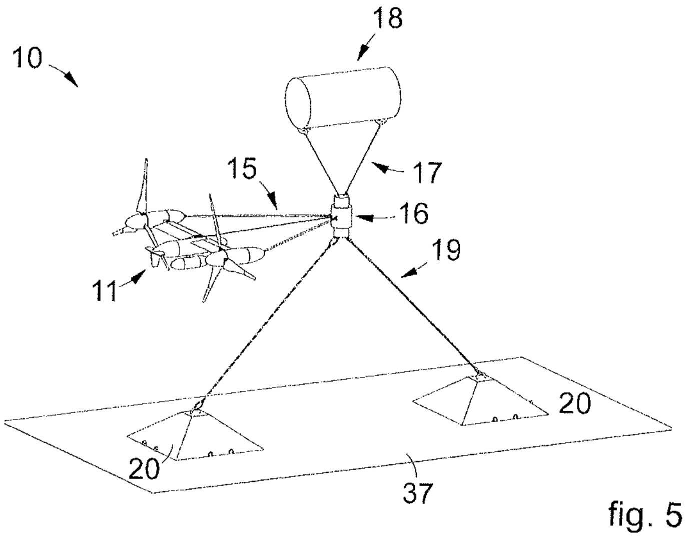
FIG. 5 is a first three-dimensional view of the present apparatus.
Figure 6:
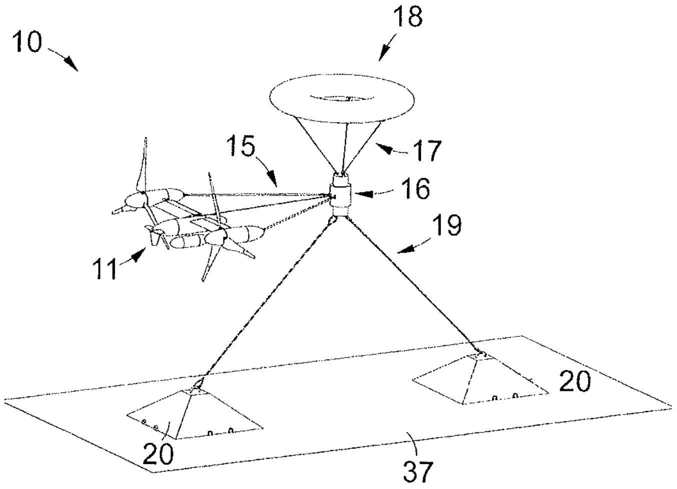
FIG. 6 is a second three-dimensional view of the present apparatus.
Figure 7:
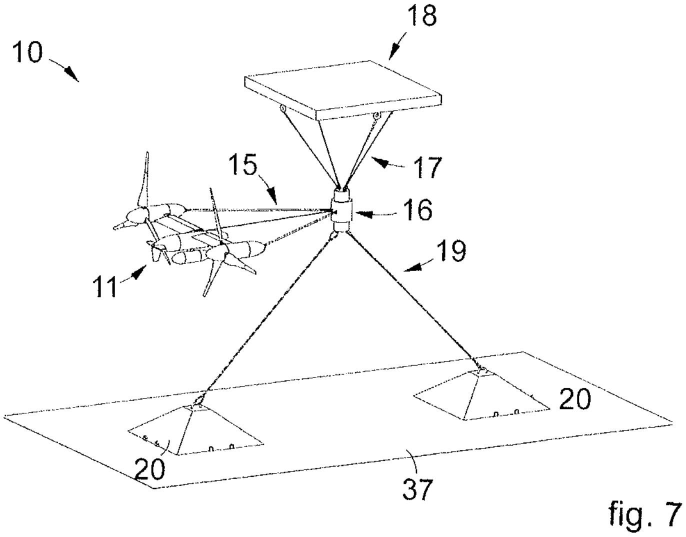
FIG. 7 is another three-dimensional view of the present apparatus.

FIGS. 5, 6 and 7 show, purely by way of example, three advantageous embodiments of the second float 18, 18', 18". The float 18 of FIG. 5 has a substantially cylindrical shape, the float 18' of FIG. 6 has a toroidal shape, while the float 18" of FIG. 7 has a rectangular parallelepiped shape. The shapes of the second float 18, 18', 18" are aimed at reducing resistance and maximizing buoyancy, while guaranteeing the static stability and independence of the float with respect to the direction W of the current. However, the second float 18, 18', 18" can also have different shapes than those shown.

The third connection elements 19 can comprise a plurality of ropes 35 attached on one side to the pin 26, in particular to the end 30, and on the other side to the anchoring means 20 which, for example, can be placed on a seabed 37.

The instrumentation provided for the operation of the apparatus 10 can be positioned inside the first float 12, for example instrumentation for data acquisition and control, electrical connections, back-up batteries, inertial platforms, data recorders or other. The first float 12 can be equipped with a watertight access door 38.

The first float 12 can also contain chambers for the accumulation and expulsion of air in order to ensure the right buoyancy and configuration, both managed through the expulsion, inlet or transfer of air and water between the various chambers.

The converter device 11 can also be equipped with a bulb 41, positioned underneath the first float 12, which is ballasted and allows to increase the stability of the converter device 11 and therefore of the apparatus 10.

The casings 13 are watertight and the electric generator 42 housed inside them can be connected to a revolutions multiplier, in turn connected to the rotor of the turbine 14.

The casings 13 can be connected to the first float by means of structures which can have sections or a fairing similar in shape to wing profiles 36, which contribute to increasing the stability and improving the hydrodynamic behavior of the apparatus 10. The casings 13 and the first float 12 can be reciprocally connected so that they are substantially coplanar.

The turbines 14 are made to rotate by the sea current and transmit the mechanical torque thus generated to the electric generators 42, thus allowing to transform the kinetic energy first into mechanical rotation energy and then into electrical energy.

The alignment device 16 substantially allows the 360° rotation of the converter device 11, so that it can align with the direction W of the water current, acting as a sort of bearing which, thanks to the rotation of the external ring 25 with respect to the internal pin 26, allows the automatic alignment of the converter device 11 with the direction W of the sea current. The ring 25 can rotate with respect to the pin 26 about an axis V which is substantially orthogonal to the direction W of the sea current.

When the apparatus 10 is in operation, advantageously, the first float 12 is discharged by the thrust forces F1 acting on the turbines 14, which are transmitted directly through the first connection elements 15, in particular the traction-loaded rods 23, to the internal pin 26 of the alignment device 16, which is suitably sized. The buoyancy force F2 of the second float 18 and the reactions F3 and F4 of the anchoring means 20 are in equilibrium with each other thanks to the internal pin 26 which absorbs these loads and which passes through the alignment device 16. FIG. 1 also shows the weight forces P1, P2 and P3 of the second float 18, of the alignment device 16 and of the converter device 11, respectively, and also the buoyancy force F5 of the first float 12.

The sole function of first float 12 of the converter device 11 is therefore substantially to house the instrumentation and to maintain a neutral or slightly positive buoyancy of the converter device 11.

During its operation, the equilibrium of the converter device 11 which is submerged at the desired depth is ensured by the equilibrium of the traction of the mooring of the anchoring means 20, by the thrust of the sea current in the direction W which is generated on the blades 21 of the turbines 14, and by the buoyancy force F5 of the first float 12.

The converter device 11 can be connected to the electric network by means of an electric cable for example, which runs along one of the mooring ropes 35 and extends to an electric cabin or to batteries installed on shore.

During operation, the converter device 11 behaves like a sort of submarine kite that remains fixed in position thanks to the equilibrium of the forces F1-F5, of the weights P1-P3 and of the sea current acting in the direction W.

5 The anchoring means 20 can be of a dead weight type, with installation by means of foundation piles in the seabed or with any known anchoring technique whatsoever.

Figure 4:
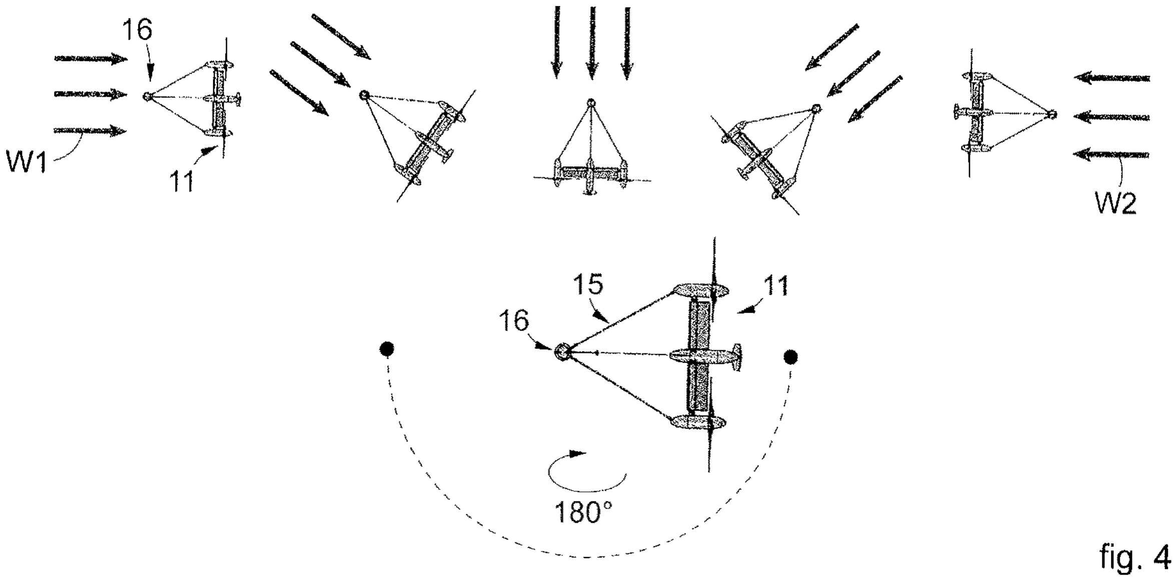
FIG. 4 is a schematic plan view of a mode of alignment of the present apparatus with respect to a sea current.

For sites where the intention is to exploit tidal currents with a well-known current direction, it is possible to provide that the converter device 11 varies its direction by about 180° when the direction of the tide changes, therefore for rising and dropping tidal currents. For example, please see FIG. 4: the sea current initially directed in the direction W1 slowly changes direction, by about 180°, until it is directed in the direction W2. The converter device 11, thanks to the device 16 and to the vertical tail plane 40, realigns itself, positioning itself at the opposite end.

To prevent the electric cable from twisting, the converter device 11 can be allowed to always rotate in the same direction, thus occupying a space relative to an arc of 180°. If the system, upon a change of direction of the current, wants to rotate in the wrong direction, one or both turbines 14 are briefly driven, thus functioning as propellers, and through their control they pre-align the converter device 11 in the correct direction of rotation. The presence of the vertical tail plane 40 will allow to complete the step of rotation in the correct direction in a passive manner.

The present apparatus 10 advantageously offers the possibility of automatic and passive rotation of the entire converter device 11, thus allowing its "natural" alignment with the sea current, without needing the continuous action of active control systems for the alignment. The need to align the axis A of the rotor of the turbines 14 with the current derives from the fact that in this condition the efficiency of the turbines is maximum compared to those cases in which the current hits the rotor with an angle with respect to the axis of the rotor itself different to zero.

Another advantage of the present apparatus 10 lies in the possibility of surfacing the converter device 11, for example by releasing the connection of the rods 23 in the hinges 24, releasing the cable 22 by means of a winch positioned in the first float 12 and by filling the internal watertight chambers with air taken from the internal tanks, which increases the overall buoyancy of the system allowing it to climb. The surfacing can be useful for carrying out routine maintenance of the electric generators 42, the turbines 14, or other. The possibility of carrying out maintenance of the most delicate components of the system out of the water through a simple surfacing operation is an important feature in completely submerged systems that generate energy from sea currents. The systems that are positioned on the seabed by means of a structure or tower require maintenance that is either carried out at the installation depth, or for which ships are required that have to bring the entire structure out of the water, both operations that are extremely costly from an economic point of view. The positioning of the present apparatus 10 at an intermediate depth between the free surface of the water and the seabed 37, as shown in FIG. 1, has multiple advantages: the possibility of intercepting the maximum speed of the sea current, therefore the speed that allows a greater production of energy by the turbines 14; the sea current, in fact, is significantly reduced when moving from the surface of the sea toward the seabed. The absence of interaction of the system, during its operation, with wave motion, the effects of which are greatest in proximity to the free surface of the water, for example during extreme events. Furthermore, for some systems with structures always floating above sea level, the weather and maritime traffic represent a problem for correct operation. The total absence of visual impact.

It is clear that modifications and/or additions of parts or steps may be made to the apparatus 10 for producing electrical energy from water currents as described heretofore, without departing from the field and scope of the present invention, as defined by the claims. 25

In the following claims, the sole purpose of the references in brackets is to facilitate reading and they must not be considered as restrictive factors with regard to the field of protection claimed in the specific claims.

The invention claimed is:

1. An apparatus for producing electrical energy, the apparatus comprising a converter device for converting kinetic energy of a water current into electrical energy, provided with a first float on sides of which there is positioned a plurality of casings equipped with turbines, each turbine being connected to an electric generator housed in said casings, wherein said converter device is connected by means of first connection elements to an alignment device, wherein said alignment device is connected on one side and by means of second connection elements to a second float and on the other side and by means of third connection elements to anchoring means, wherein said converter device, said second float, and said alignment device are totally submerged during operation, wherein said alignment device is configured to allow said turbines to rotate up to an angle of 180° about an axis of said alignment device, wherein said alignment device comprises an external ring to which said first connection elements are connected, wherein said external ring is configured to rotate with respect to a fixed internal pin to which the second and third connection elements are connected, and wherein said first float is equipped with a first horizontal tail plane and a second vertical tail plane configured to increase stability of said converter device and to allow rotation of said turbines about said axis of said alignment device to automatically align said turbines with a direction of the water current.

2. The apparatus as in claim 1, wherein said external ring rotates about an axis which is substantially orthogonal to the direction of a sea current.

3. The apparatus as in claim 1, wherein rolling means are positioned between said fixed internal pin and said external ring.

4. The apparatus as in claim 1, wherein said first connection elements comprise at least one cable for connecting said first float to said external ring.

5. The apparatus as in claim 1, wherein said first connection elements comprise at least one rod for connecting each of said casings to said external ring.

6. The apparatus as in claim 1, wherein said second connection elements comprise a plurality of ropes attached on one side to said fixed internal pin and on the other side to the second float.

7. The apparatus as in claim 1, wherein said third connection elements comprise a plurality of ropes attached on one side to said fixed internal pin and on the other side to said anchoring means.

8. The apparatus as in claim 1, wherein said second and third connection elements are connected respectively to opposite ends of said fixed internal pin.

9. The apparatus as in claim 1, wherein said converter device is equipped with a bulb positioned underneath said first float.

10. The apparatus as in claim 1, wherein said first float contains inside it a plurality of watertight chambers, which can contain air or water or a combination of the two, with corresponding transfer pumps and valves, thus allowing to manage buoyancy of said first float, and wherein an overall buoyancy required by said converter device is distributable between said first float and said second float so as to concentrate all of said overall buoyancy on said first float with zero buoyancy on said second float, all of said overall buoyancy on said second float with zero buoyancy on said first flat, or in any intermediate distribution between said first float and said second float, thereby managing an upward buoyancy force and therefore an overall configuration of said converter device.

11. The apparatus as in claim 1, wherein said first float comprises a winch configured to surface the converter device.

* * * * *